F. W. STEWART.
METHOD OF MAKING GLASSWARE.
APPLICATION FILED JUNE 20, 1916.

1,259,156.

Patented Mar. 12, 1918.

INVENTOR
Frederick W. Stewart
By Kay Totten Powell
attys

UNITED STATES PATENT OFFICE.

FREDERICK W. STEWART, OF BEAVER, PENNSYLVANIA, ASSIGNOR OF ONE-HALF TO PHOENIX GLASS COMPANY, OF PITTSBURGH, PENNSYLVANIA, A CORPORATION OF WEST VIRGINIA.

METHOD OF MAKING GLASSWARE.

1,259,156.  Specification of Letters Patent.  Patented Mar. 12, 1918.

Application filed June 20, 1916. Serial No. 104,668.

*To all whom it may concern:*

Be it known that I, FREDERICK W. STEWART, a citizen of the United States, and resident of Beaver, in the county of Beaver and State of Pennsylvania, have invented a new and useful Improvement in Methods of Making Glassware; and I do hereby declare the following to be a full, clear, and exact description thereof.

My invention relates to method of making hollow articles of glassware, and more especially to articles having both ends open such as globes or shades.

In the method now usually employed for blowing such articles, the blank is first pressed in a mold which forms the upper or neck portion. With the open-ended upper or neck portion and with the inner end closed, this blank is removed from the pressing mold and inserted in the blow mold whereupon air is admitted to blow the glass out to conform to the shape of the mold. The article when removed from the blow mold is closed at its inner end, the glass having been blown to an even thickness throughout the article. This inner end portion is then cracked off and the inner end ground to even or smooth up the edge. The cracking off of this closed end portion where the glass is of the same thickness throughout is often attended with difficulties, and in cracking off, the whole globe or shade may be destroyed.

The object of my invention is to provide a method whereby the closed inner end or portion to be cracked off is of thinner glass than the main body of the article so that the cracking off can be done very readily at this thinned portion without affecting the main body of the article.

My improved method consists, generally stated, in introducing the pressed open top blank into the blow mold supporting the inner end of the blank on the bottom of the mold, introducing a gaseous fluid to blow the glass out to conform to the mold, thinning the glass at the lower end beyond the end of the finished article, whereby when the article is removed from the mold the closed end portion to be cracked off may be readily separated from the main portion of the article leaving the rough edge to be finished in any suitable manner.

Figure 1:
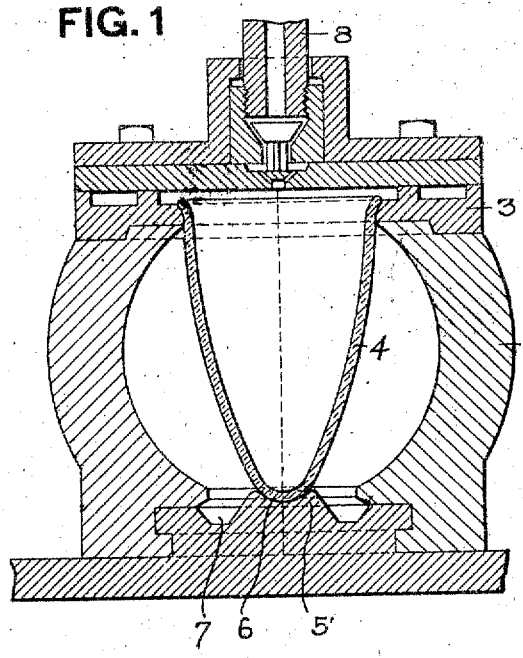
Figure 2:
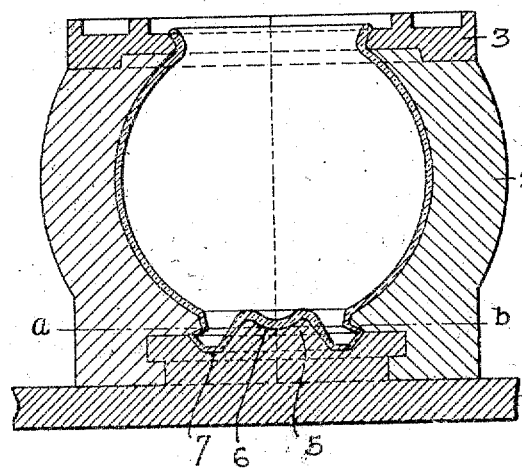
Figure 3:
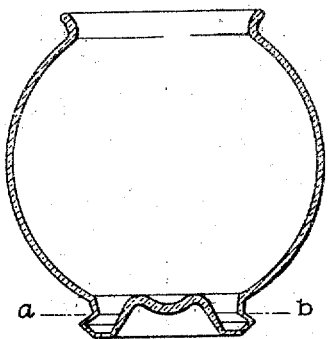
Figure 4:
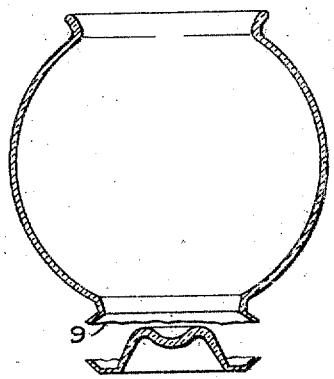
Figure 5:
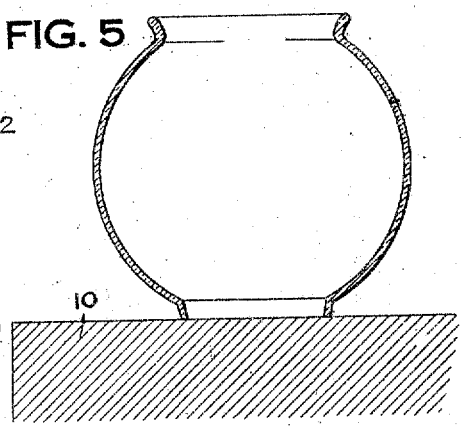

In the accompanying drawings, I have illustrated the steps of my improved method, in which Figure 1 shows the blank supported in the blow-mold ready for the blowing operation; Fig. 2 shows the article blown within the blow-mold. Fig. 3 shows the article removed from the blow-mold; Fig. 4 shows the article cracked off; and Fig. 5 shows the article in the process of grinding off its rough edge.

Referring to the drawings, the numeral 2 designates a suitable blow mold adapted to support the neck ring 3 in the usual manner, said neck ring having been removed from the mold in which the blank 4 was pressed, and placed upon the blow mold with the blank extending down into the blow mold and resting on the raised central bottom portion 5 of the blow mold. This raised bottom portion 5 has the concave seat 6 in which the inner end of the blank rests and an annular recess 7 being formed around this raised central portion 5.

When the blank has been arranged in the blow-mold in the manner indicated in Fig. 1, air is admitted to the blank through a suitable blow-pipe 8 and the blank is expanded so as to conform to the shape of the blow mold cavity, which in this case is shaped to form a glass globe or shade.

The admission of the air in this manner blows the glass out against the walls of the blow-mold cavity, the glass being blown to an even thickness throughout the article itself, but where one end of the blank has been chilled by resting in the seat 6 in contact with the mold, the glass does not blow to the same degree of thinness as the walls of the article and the glass which is blown down into the annular recess 7 is thinned out as indicated in Fig. 2 up to the point $a$—$b$ where the finished article itself ends, and from which point the glass forming the closed inner end portion is to be cracked off.

When the article has been blown in this manner and removed from the blow-mold, it has the appearance indicated in Fig. 3, the glass beyond the line $a$—$b$ being considerably thinner than the main body of the globe.

In order to separate this portion from the main body of the globe, the operator takes an instrument and by inserting it within the globe and tapping on the closed end portion, the glass at the thinned portion breaks away and separates, as indicated in Fig. 4. This leaves the rough edge portion 9, which is ground off or removed by applying the globe to the grinding stone 10 in the ordinary manner.

By my invention, I provide a very simple and efficient method of providing for the removal of the closed end portion of the article, or by thinning the glass at the point described, the separation of the closed end portion is effected without difficulty and without danger of breaking or marring the main body of the glass.

What I claim is:

1. The method of forming articles of glassware having openings at each end thereof consisting in introducing a pressed open-top blank into a blow mold supporting the inner end of said blank at a point raised above the bottom of the mold cavity, introducing gaseous fluid to blow the glass out to conform to the mold-cavity, thinning the glass at the lower end beyond the end of the finished article, removing the article from the mold, and cracking it off at the thinned portion and finishing the rough edge.

2. The method of blowing articles of glassware having openings at each end thereof consisting in introducing a pressed open-top blank while hot into a blow-mold, chilling the inner end of said article, introducing gaseous fluid to blow the glass out to conform to the mold-cavity, thinning the glass at the inner end beyond the end of the finished article, removing the article from the mold, cracking it off at the thinned portion and finishing the rough edge.

In testimony whereof, I the said FREDERICK W. STEWART, have hereunto set my hand.

FREDERICK W. STEWART.

Witnesses:
JOHN F. WILL,
IRENE F. GEYER.